March 4, 1941.  R. J. WOODS  2,233,969
PRESSED WING RIB
Filed Dec. 30, 1938  2 Sheets-Sheet 1
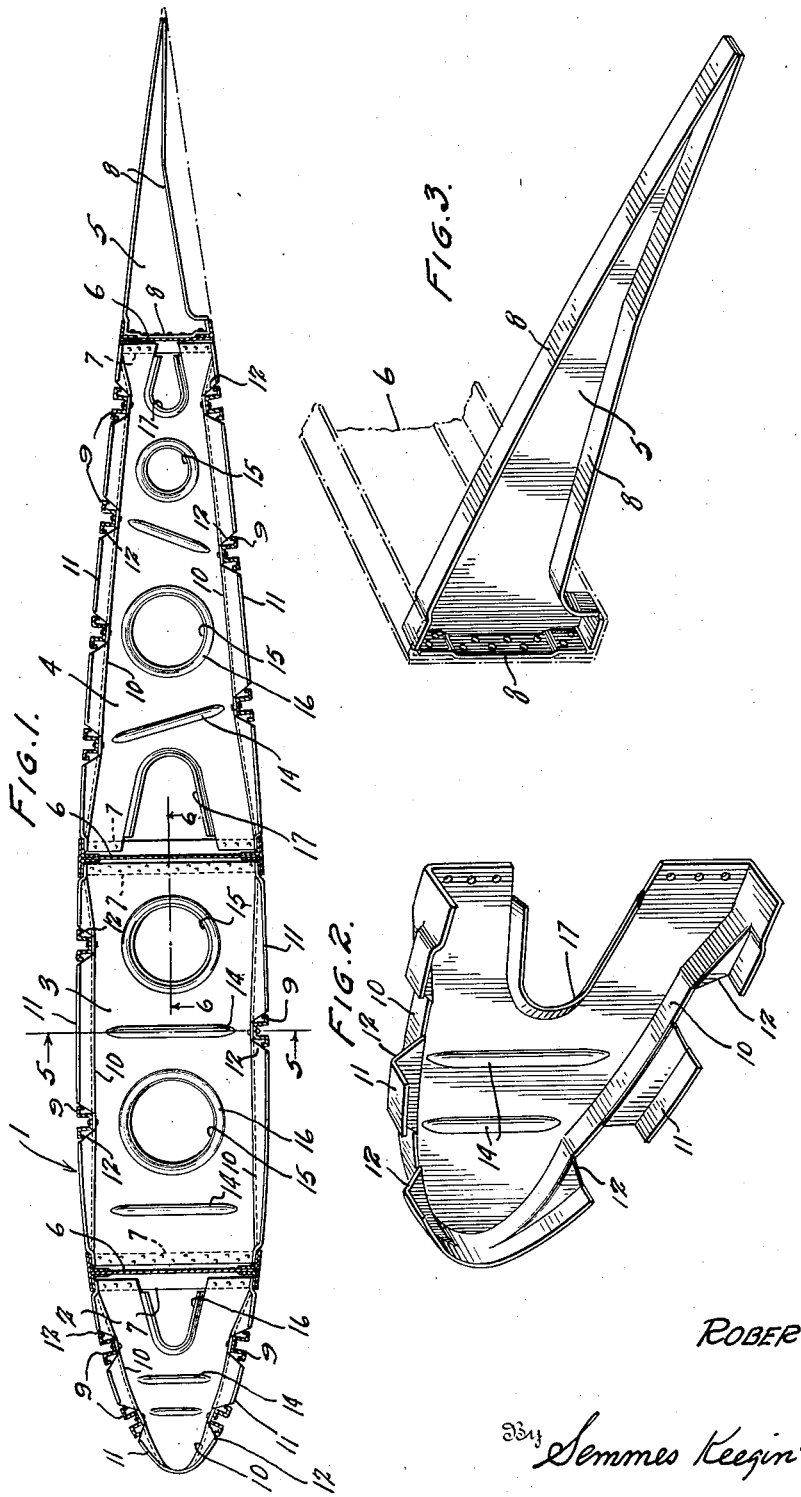
Inventor
ROBERT J. WOODS
By Semmes Keegin & Semmes
Attorneys March 4, 1941.  R. J. WOODS  2,233,969
PRESSED WING RIB
Filed Dec. 30, 1938  2 Sheets-Sheet 2
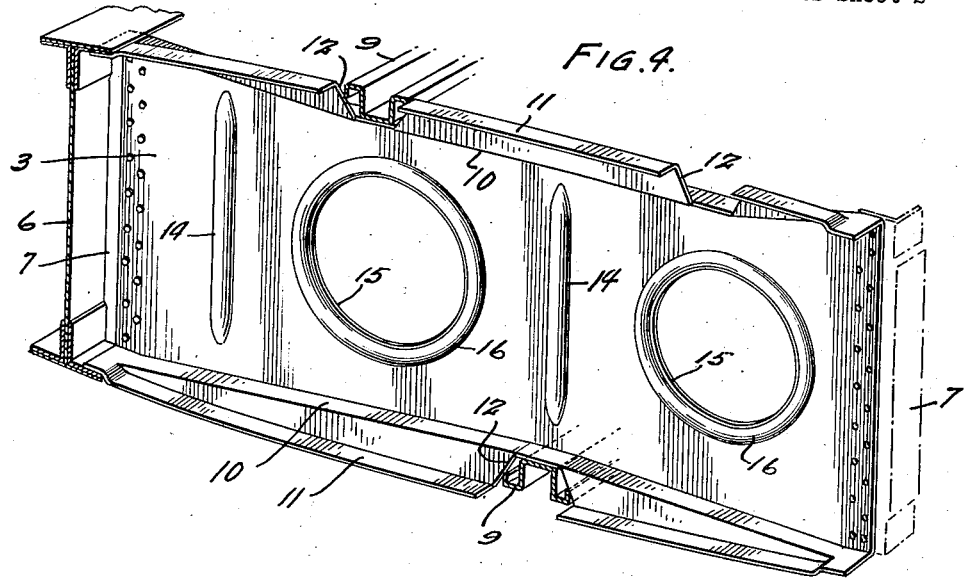
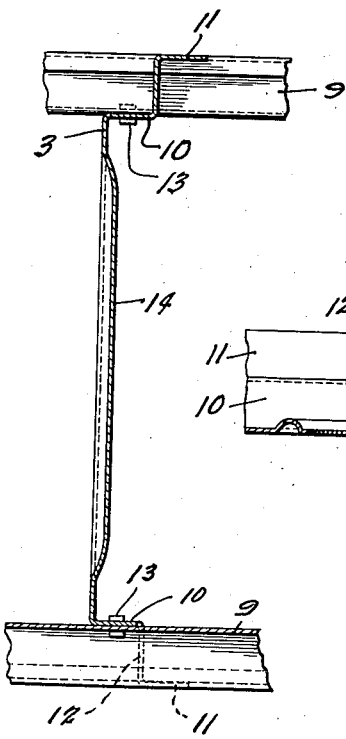
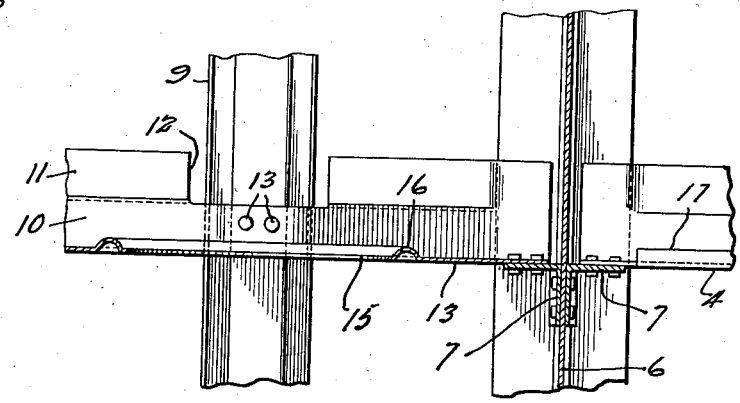
Inventor
ROBERT J. WOODS
By Semmes Keegin & Semmes
Attorneys Patented Mar. 4, 1941

2,233,969

UNITED STATES PATENT OFFICE 2,233,969

PRESSED WING RIB

Robert J. Woods, Grand Island, N. Y., assignor to Bell Aircraft Corporation, Buffalo, N. Y., a corporation of New York Application December 30, 1938, Serial No. 248,632

3 Claims. (Cl. 244—124)

This invention relates generally to the wing construction of an airplane, and more particularly to a wing rib which is formed with doubly flanged edges.

One of the objects of my invention is to provide a wing rib having flanged edges in which cutouts are provided without decreasing the inflexibility of the wing rib.

Another object of my invention is to provide a wing rib, the flexibility of design of which may be greatly varied.

A further object of my invention is to provide a wing rib which is formed from one piece in a single pressing operation.

With these and other objects in view, my invention embraces the concept of providing a wing rib which is shaped to the contour of the wing and is provided with a double flanged edge. This construction permits cut-outs to be made in a portion of the flange without reducing the strength of the wing rib. In this manner, additional means of strengthening the wing rib are not necessary.

The cut-outs are of sufficient depth and shape to allow stringers which extend longitudinally of the wing to be attached in such a manner that their outer edges are flush with the outer surface of the wing rib. This permits the skin to be placed over the stringers and wing ribs secured to both these members.

In the drawings:

Figure 1 is a cross-sectional view of the main airfoil of an airplane.

Figure 2 is a perspective view of the leading edge wing rib shown in Figure 1.

Figure 3 is a perspective view of the trailing edge wing rib shown in Figure 1.

Figure 4 is a perspective view of the forward intermediate wing rib shown in Figure 1.

Figure 5 is a view taken along line 5—5 of Figure 1, looking in the direction of the arrows.

Figure 6 is a view taken along line 6—6 of Figure 1, looking in the direction of the arrows.

As best shown in Figure 1, my invention consists in a wing construction which is generally designated by the numeral 1. This wing construction consists of a leading edge wing rib 2, a forward intermediate wing rib 3, a rearward intermediate wing rib 4, and a trailing edge wing rib 5. These wing ribs are shaped to the contour of the wing and are attached to the beams 6 by means of angles 7 as shown in Figure 6. All these wing ribs are formed in one pressing operation.

In fabricating these wing ribs, the trailing edge wing rib is formed to provide integral flanges 8. This construction makes the wing rib 5 inflexible.

The remaining wing ribs are adapted to carry stringers 9. For this reason they are formed with double flanged upper and lower edges which are substantially Z shaped. This double flange consists of intermediate flange 10 and an edge flange 11. Cut-outs 12 are formed in the edges in which the stringers 9 are mounted. These cut-outs extend in depth only to the intermediate flange 10. In this design the stringers may be attached to the intermediate flange 10 so that their free surfaces may lie flush with the contour of the wing rib.

By means of this double flange construction, which is one of the principal features of my invention, cut-outs are provided in the flanged edges of the wing rib without totally destroying the flange. By this means, an airfoil may be fabricated with integrally formed rigid wing ribs.

The stringers 9 which extend longitudinally through the wing span are connected to the wing ribs by any suitable means such as the riveting 13. After the stringers have been attached to the wing ribs, the skin of the wing is placed over this flush surface and attached both to stringers and wing ribs.

The wing ribs may be provided with integral stiffeners 14 and with lightening holes 15 which are reenforced by peripheral beading 16. These wing ribs may also be provided with flanged control cut-outs such as shown at 17 which are designed to carry control means, and other operating equipment.

From the above description it is apparent that I have provided a wing rib which is provided with notches to carry longitudinal stringers without reducing the ability of the wing rib to withstand bending stresses. This design simplifies construction and reduces the weight of the wing rib to a minimum. By producing the wing ribs in one piece, the cost of production is greatly reduced. The construction also adapts itself to standardization of parts, thus greatly eliminating time employed in fitting and assembly.

While for purposes of illustration I have described one modification of my invention, it is obvious that the construction of the double flanges and other features of my invention may be modified to accommodate the wing rib for use in various types of construction without departing from the spirit of this invention.

I, therefore, intend that this invention be only limited by the prior art and the scope of the appended claims.

I claim:

1. An airplane wing rib including a section pressed from a single sheet of material, said section being provided with integrally formed double flanged top and bottom edges, the outer portion of said flange being notched to enable stringers to pass through the wing rib.

2. In an airplane wing provided with an outer skin and longitudinally extending stringers, a wing rib which is provided with double flanged edges, said wing rib and double flanges being pressed from a single sheet of material and the outer portion of said double flange being notched, means located in the notches to attach the longitudinally extending stringers to the wing rib, and means on the castellated portion of the outer flange to attach the outer skin of the said wing.

3. In an airplane wing provided with an outer skin and longitudinally extending stringers, a wing rib which is provided with Z-shaped double flanged edges, said wing rib and double flanges being pressed from a single sheet of material and the outer portion of said double flange being provided with notches, means located in the notches to attach the longitudinally extending stringers to the wing rib, and means on the castellated portion of the outer flange to attach the outer skin of the said wing.

ROBERT J. WOODS.